United States Patent [19]

Beshay

[11] Patent Number: 5,008,310

[45] Date of Patent: Apr. 16, 1991

[54] POLYMER COMPOSITES BASED CELLULOSE-V

[76] Inventor: Alphons D. Beshay, 3595 de Courval, Trois-Rivières, Quebec G8Z 1S8, Canada

[21] Appl. No.: 353,365

[22] Filed: May 15, 1989

[51] Int. Cl.$^5$ .................... C08L 89/00; C08K 3/00; C08K 3/34
[52] U.S. Cl. ........................................ 524/13; 524/14; 524/35; 524/36; 524/47; 524/424; 524/425; 524/445; 524/449; 524/452; 524/492; 524/493; 524/494
[58] Field of Search .................. 524/13, 14, 35, 36, 524/47, 424, 425, 445, 449, 452, 492, 493, 494

[56] References Cited

U.S. PATENT DOCUMENTS

| | | | |
|---|---|---|---|
| 4,020,125 | 4/1977 | Suzuki et al. | 525/126 |
| 4,376,144 | 3/1983 | Goettler | 428/361 |
| 4,820,749 | 4/1989 | Beshay | 524/35 |

*Primary Examiner*—Nathan M. Nutter

[57] ABSTRACT

Polymer composites can be made from cellulosic & polymeric matrix, which may be thermoplastic or thermosetting, or rubber. The cellulosic material is grafted with isocyanate bonding agent and may be mixed with prebonded inorganic filler with a bonding agent. Furthermore, said bonded inorganic filler can be added to polymer composites filled with cellulosic fibers grafted with silylating agent. These polymer composites are useful for most plastic articles.

9 Claims, No Drawings

POLYMER COMPOSITES BASED CELLULOSE-V

BACKGROUND OF INVENTION (1) Field of the Invention

This invention relates to polymer composites. More particularly, this invention relates to a technique for grafting organic materials as such, with isocyanate and may be mixed with an inorganic material bonded or not with a bonding agent. Bonding the isocyanated material with a thermoplastic resin produces either composites having improved physicomechanical properties, or composites having only strongly bonded components.

So, this invention is a continuation-in-part of Beshay's U.S. Pat. Nos. 4,717,742 and 4,820,749.

(2) Description of Prior Art

The modification of the physical and mechanical properties of thermoplastic, thermosetting or rubbers by the addition of a filler is well known in the art. Greater degrees of property improvement result when the filler is uniformly and highly dispersed throughout the polymer matrix and/or when its chemical interface provides a possible site weakness in the composite.

Various means for improving the compatibility of the filler with the polymer matrix by providing an interaction between the filler and the polymer are known in the art. For Example, when a cellulosic material, such as wood fibers, or cotton fibers, are used as a filler in the polymers containing methylol groups such as phenolic urea or melamine resins, a reaction occurs between the methylol groups and the hydroxyl groups on the cellulosic filler. Inorganic fillers such as calcium carbonate, clay or asbestos have been encapsulated and dispersed in a polyolefin in order to obtain improved properties. Some materials such as maleic anhydride or others were bonded by the effect of the initiating agents such as peroxides. In such a system, the polymer used to coat the filler should be chemically bonded to the filler in order to obtain optimum properties such as high strength.

The published literatures include a number of proposals, which consist essentially of thermoplastic resinous matrix having dispersed therein cellulosic fillers mixed or not with inorganic fillers. Such materials are described for example:

U.S. Pat. No. 3,485,777 (1969), Gaylord, deals with compatibilization of polyvinylchloride or polymethylmethacrylate with grafted cellulose.

U.S. Pat. No. 3,645,939, also shows that polyethylene or polyvinyl chloride or acrylic rubber can be compatibilized with cellulosic fibers in presence of an ethylenically unsaturated carboxylic acid or anhydride under conditions which generate free radical on said polymer and cellulose.

U.K. Pat. Appl. No. 2090849, Hishida, I., prepared composites from thermoplastic resins by compatibilizing flax fibers coated with a surface treating agent such as silanes, titanates, ... etc. in absence of a free radical initiator.

U.S. Pat. No. 4,554,215, Robbart, made composites coated with alkylhalogeno-silane, also in absence of an initiator.

U.S. Pat. No. 4,374,178, Kulkarni, prepared composites by filling with calcium carbonate or sodium silicate and a microcrystalline cellulose as a carrier by coating with silane bonding agent.

E.P. Pat. No. 0008143, Solvay & Cie and the Japanese Pat. No. 8011-537, Showa, both teach the application of organic and inorganic fillers in presence of a peroxide and an acid anhydride; resulting composite materials having relatively little improvements in their mechanical strengths.

J 5 Pat. No. 7192-466, Showa, teaches the addition of an unsaturated silane coupling agent onto the polyolefin matrix by the effect of a catalytic peroxide and then by adding wood flour as a filler, but by silylating the matrix leads to consuming more silane than in case of silylating the filler itself. Furthermore, the composite performances are not highly improved.

U.K. Pat. Appl. No. 8705045, prepared composites with just coating the wood pulps with isocyanate bonding agents by assuming the formation of interfacial covalent bonding and in absence of any specific catalyst leading to the grafting of isocyanates onto the cellulosic fibers. Furthermore, no inorganic filler pretreated with any bonding agent was added to mix with the organic filler.

The applicant, in his Ca. Pat. No. 1252586 and the U.K. Pat. Appl. No. 2205569, Beshay, realized more improvements by mixing the silane grafted cellulosic fibers with a silane bonded inorganic fillers.

According to the present invention, the isocyanate grafting and bonding process creates strong attachments between the mixture of components and the isocyanate agent. The grafting process could either be partial or complete. The process could be completed by the effect of a hot molten polymer resin, which provides sites for the formation of free radicals with desired degrees of loading by the initiation effect to attach by chemical bonding to the other side of the isocyanate molecules, which are pregrafted and prebonded with the mixture of materials. Thus for example, the properties of polyethylene, polystyrene and polyvinylchloride are improved by the incorporation of the grafted filler mixture in the presence of a free radical catalyst such as dicumyl peroxide. The composition ratios range from 1 to 99% by weight of the grafted and bonded isocyanated materials.

In summary, we believe to be the first to prepare composites of polymeric resin or resin blend and cellulosic fibers grafted with isocyanates by generating a free radical process and which may mix with inorganic filler(s), prebonded or not, with a bonding agent; if the cellulosic fibers are coated with isocyanates, it is provided to mix with bonded inorganic filler(s) with bonding agent(s).

SUMMARY OF THE INVENTION

The performances of polymer composites based cellulose are improved by increasing the interfacial bonding strengths between the composite constituents. Said improvements show their values by mixing the cellulosic fibers coated with isocyanates with prebonded inorganic filler(s) with bonding agent(s). Furthermore, in order to prepare composites of highly improved performances, the cellulosic fibers are grafted with isocyanates by generating a free radical process and by mixing with inorganic filler(s), whether prebonded or not, with bonding agent(s).

The cellulosic fibers and starch in the present invention may be:

(a) Coated with the isocyanate as a bonding agent, and providing mixing with prebonded inorganic filler(s) with bonding agent(s).

(b) Grafted with isocyanate by the effect of a specific catalyst and optionally mixed with inorganic filler(s), whether bonded or not with bonding agent(s).

The term coating means covering the cellulosic fibers with isocyanate bonding agent in absence of a catalyst.

The term grafting here means the formation of interfacial primary bonding between the cellulosic molecules and the isocyanates bonding agent(s) and the polymeric matrix, by the effect of a specific catalyst, or by applying a process to generate free radicals of the reactants.

DETAILED DESCRIPTION OF THE INVENTION

Some aspects of this invention, during its preparation, are the easiness in its chemical technique, time and energy savinng, no waste of chemicals and lower in costs. In an embodiment, the organic filler used in the present invention for preparing composites have low cost economy, light weight, less machine wear, no health hazard and renewable nature. The resultant composite materials in this invention have high durability and less surface fracture and superior stability under extreme conditions compared to other composites filled with fiber glass or mica.

An object of this invention is to provide an improved technique for compatibilizing particulate isocyanated materials with synthetic polymeric matrix or rubber.

Another object of this invention is to provide a process for grafting an isocyanate agent onto an organic material which may be previously or lately mixed with an inorganic material.

The organic material is selected from the group of starch and cellulosic materials. Any effective method can be applied for grafting and bonding an isocyanate agent onto the said organic materials or organic and inorganic mixture materials, so as to make the filler or bonding materials compatible for thermoplastic or thermosetting polymers or rubbers with controlled weight ratios according to desired applications.

Another embodiment of this invention proves that the resultant mechanical strengths of composites produced from bonding thermoplastic polymers with isocyanate mixture of organic and inorganic materials are much better compared to those of composites produced by bonding the same polymer resin with each individual isocyanated mixture components.

A further embodiment of this invention is not only to render an isocyanated mixture of an organic and an inorganic materials compatible as a filler for thermoplastic polymers to improve their physical and mechanical properties, but also to bond, gloue or coat said isocyanated materials or the grafted cellulosic material only with polymer resin which is a thermoplastic, thermosetting or rubber, which leads to several useful applications such as fabrication of boards or pannels, plastic coatings, glouings or to be adapted for other useful applications.

The cellulosic, inorganic or synthetic polymer resin material could be in different states and forms. The states could be solids, dissolved or melted solids, liquid or solutions. The forms could be powders, particles, crystals, fibers, sheets, papers, cartons, threads, cloths, gravels, chips, boards, pannels, preshaped forms, . . . etc.

This invention can be optimized by adjusting the methods and/or conditions of preparations. Thus, it shows its most useful applications with polyethylene, polystyrene and polyvinylchloride reinforced with wood pulps grafted with polymethylenepolyphenyleneisocyanate (PMPPIC), mixed or not with calcium carbonate, asbestos or clay prebonded with a silane (A-1100) in presence or absence of maleic anhydride.

However, this invention is not limited to such materials, nor to their weight ratios. It also shows advantages when used with any kind or any weight ratio of isocyanate agents in grafting with any kind or any weight ratio of organic fillers selected from the group of starch or cellulosic material such as cotton fibers, other wood pulps, stem or vegetable fibers, starch, waste papers, cartons, wood or cellulosic cloth, wood flours, or any natural or synthetic cellulosic material which may be mixed with any kind or any weight ratio of inorganic fillers selected from a compound containing hydroxyl group, clay, calcim carbonate, asbestos, sand, wollastonite, quartz, glass, mica, diatomaceous earth, silica talc, kaolinite, hydrated or partially hydrated metal oxides, metal powders or fibers, metal compounds, carbon, graphite, synthetic or a natural occurring material and if naturally occurring, they could be used in either purified or unpurified form. Also more than one kind of inorganic material can be mixed or bonded with the cellulosic materials.

In addition, for the preparation of composites by compounding the isocyanated mixture of materials with rubbers, thermosettings or thermoplastic polymers, the polymeric or copolymeric resins or resin blends to be used in the present invention are those including polyethylene, polypropylene, polyvinylchloride, polystyrene, polymethylmethacrylate, polycarbonates, polyacrylonitryl butadiene styrene (ABS) alloys, or other polyblends, and may be those described in U.S. Pat. No. 4,317,765, or other polymeric, or copolymeric or thermoplastic, or thermosetting resin, or resin blends or rubber.

The ethylenically unsaturated carboxylic acid or acid anhydride as an auxiliary agent used in the practice of this invention is preferably a dicarboxylic acid such as maleic acid, maleic anhydride, furmaric acid, citraconic acid, or itaconic acid. Maleic anhydride is the preferred auxiliary agent. Monocarboxylic acids such as acrylic acid and methacrylic acid may also be used.

Instead of maleic anhydride polymaleic anhydride, succinic anhydride or any acid/acid anhydride and the like may be used.

The other bonding agents to bond with inorganic filler(s) are titanium coupling agents, zirconium coupling agents, stearates, or the like.

The silylating agents to be bonded with the inorganic filler are those described in U.S. Pat. No. 4,820,749.

The titanium bonding agents are also those as described in the Modern Plastic Encyclopedia, 1986-87, pp. 128 & 130.

The isocyanates for the cellulosic fibers, or the inorganic filler(s) are such as polymethylene polyphenylisocyanate (PMPPIC), 4,4'-diphenylmethane di-isocyanate, 1,6 hexamethylene di-isocyanate, 2,4 toluene di-isocyanate, or their oligomers, or the like.

The grafting of isocyanate onto the cellulosic fibers may be carried out by generating a free radical process. The free radicals can be generated for the purpose of forming interfacial strong bonding such as the covalent bonds. The free radical initiator may be those from the radiation sources or from the chemical sources. The radiation sources are such as gamma radiation, ultraviolet radiation, laser radiation, or the ultrasonic, or the like. The chemical initiation may be from any catalytic initiator causing the free radical reactions, among which are the chemical initiators listed in the Polymer Hand-Book, Interscience 1966, pp. II-3 to II -51, or the like.

Wax(es) may optionally be added as further filler(s) surface treatments.

The plasticizers, which may be contained in the present composites' invention, are such as dipropylene glycol dibenzoate, di-2-ethylhexyl adipate, diisodecyl adipate; azelates, di-2-ethylhexyl azelates; phosphates, such as tricresylphosphate, cresyl diphenyl phosphate, 2-ethylhexyl diphenyl phosphate, di-n-octyl phenyl phosphate, and tri-n-hexyl phosphate; phtalates, such as diethylphthalate, butyl benzyl phthalate, di-2-ethylhexylphtalate diisodecyl phtalate; sebacates, such di-2-ethylhexyl sebacate; and terephthalates, such as di-2-ethylhexyl terephthatate; or the like.

Other additives are optionally added, such as colorants, antioxidants, lubricants, pigments, opacifiers, heat stabilizers, impact modifiers, photostabilizers, antistatic agents, biostabilizers, crystal nucleating agents, or the like. The grafting mechanisme of isocyanate onto cellulose may be:

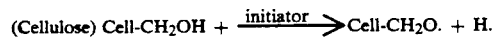

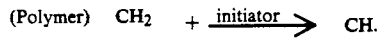

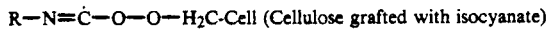

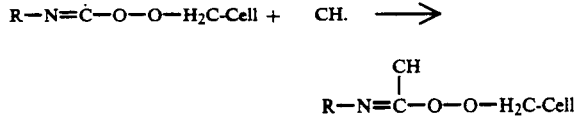

A composite material may be made according to the invention by compounding from 1 to 98 wt. % of cellulosic fibers or starch and from 98 to 1 wt. % of polymeric or copolymeric thermoplastic or thermosetting resin or resin blends, or rubber, to bond with each other by grafting through a free radical process with 0.1 to 20 wt. % or isocyanate(s). The same composite material may additionally comprise from 0 to 10wt. % catalytic initiator, from 0 to 10 wt.% ethylenically unsaturated acid or acid anhydride. It may also comprises from 0 to 95 wt. % inorganic filler(s), whether bonded or not with bonding agent(s), and from 0 to 60 wt. % plasticizer(s). Said composite material is optionally comprising colorant(s), antioxidant(s), stabilizer(s), flame-retardent(s), lubricant(s), pigment(s), opacifier(s), impact-modifier(s), photostabilizer(s), antistatic agent(s), crystal nucleating agent(s), or the like.

The inorganic filler(s), whether bonded or not with said bonding agent(s), may be mixed with the cellulosic fibers, or starch before, during or after the addition step(s) of said isocyanate bonding agent(s).

The experimentation results in the examples of the invention could be improved or be reached their optimum values by changing the preparation conditions, and/or the weight percentages of the applied materials or the substances.

This invention will now be furtherly described by non limiting examples:

EXAMPLE 1

100 g. of dried chemicalthermomechanical wood pulp (CTMWP) derived from aspen and ground at mesh size 60, are wetted with acetone solution comprising 4 g. of (PMPPIC), then evaporating the acetone solvent and then mixed with 10 g. of silane bonded lay or silane bonded glass fibers (A-1100, A-174, A-189) Union Carbide, to form mixed filler materials.

Mixing 10, 20, 30 & 40 wt. % (based on the total composite wt.) of these mixed filler materials (by using a roll-mill or a compounding extruder) with 90, 80, 70 and 60 wt. % of (hot molten) linear low density polyethylene, or polystyrene, or polyvinylchloride, (plasticizer(s) could be added such as in case of P.V.C.). Time and temperature varies according to the resin kind and resin grade, by means to prepare well compatible composite samples. Molding the resulted composites for testing according to ASTM, D1822-78, which comprises energy (KJ), stress (MPa) and modulus (MPa). The results showing improvements from 30 to 1100% based on their related neat resins.

EXAMPLE 2

The same type as in example No. 1, but the isocyanate/acetone solution additionally comprising 0.8 g. of dicumyl peroxide and in absence of the inorganic filler. The testing results show improvements from 35 to 1361%, based on their related neat resins.

EXAMPLE 3

Same type as in example No. 2, but 90 g. of (CTMP), derived from aspen, premixed with 10 g. of clay. The testing results show improvements from 37 to 1390%, based on their related neat resins.

EXAMPLE 4

Same type as in example 3, but the inorganic filler is silane (A-1100) bonded with glass fibers and with clay. The testing results show improvements from 60 to 2015%, based on their related neat resins.

It will be understood that the above description of the present invention is susceptible to various modifications, changes and adaptations, and the same are intended to be comprehended within the meaning and the scope of equivalents of the appended claims.

I claim:

1. A composite material comprising a synthetic polymeric or copolymeric material or rubber, and an organic material selected from the group consisting of cellulosic or starch material, wherein said cellulosic or starch material is essentially grafted by a free radical generating process with isocyanate agent.

2. The composite material of claim 1, wherein polymeric or copolymeric substance is selected from the group consisting of linear low density polyethylene, polypropylene, polystyrene and polyvinylchloride.

3. The composite material of claim 1, wherein the cellulosic material is selected from the group consisting of chemicalthermomechanical wood pulp derived from aspen, birch or spruce and semichemical pulp of bagasse.

4. The composite material of claim 1, which additionally comprises an inorganic filler consisting of a compound containing hydroxyl group, clay, calcium carbonate, asbestos, sand, wollastonite, quartz, glass fibers, mica, hydrated or partially hydrated metal oxides, metal powders, metal compounds, carbon and graphite.

5. The composite material of claim 4, wherein said inorganic filler material is bonded with a bonding agent.

6. The composite material of claim 1, wherein the organic material is mixed with inorganic filler material prebonded with a bonding agent, wherein said bonding agent is selected from isocyanates, silylates, zirconates, titanates and stearates.

7. The composite material of claim 1, wherein the cellulosic material whether mixed or not with inorganic filler, comprises 1-99 wt. % based on the total weight of the composite.

8. The composite material of claim 1, wherein the cellulosic material is grafted with isocyanate agent by a free radical generating process prior to incorporating same into the polymeric matrix material.

9. The composite material of claim 8, wherein the isocyanate agent is selected from polymethylene polyphenylisocyanate, 4,4'-diphenylmethane di-isocyanate, 1,6 hexamethylene di-isocyanate, 2,4 toluene di-isocyanate, or their oligomers.

* * * * *